United States Patent
Kumaki

(10) Patent No.: US 7,426,673 B2
(45) Date of Patent: Sep. 16, 2008

(54) PHS TERMINAL DEVICE AND METHOD OF RECEIVING PHS DATA

(75) Inventor: Daisuke Kumaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 405 days.

(21) Appl. No.: 11/068,039

(22) Filed: Mar. 1, 2005

(65) Prior Publication Data

US 2005/0249184 A1 Nov. 10, 2005

(30) Foreign Application Priority Data

Mar. 1, 2004 (JP) ............................. 2004-056775

(51) Int. Cl.
*H03M 13/00* (2006.01)

(52) U.S. Cl. ...................... 714/758; 370/341

(58) Field of Classification Search ........................ None
See application file for complete search history.

(56) References Cited

U.S. PATENT DOCUMENTS 5,708,682 A 1/1998 Nawata 6,515,982 B1 * 2/2003 Hagiwara .................... 370/347
6,625,125 B1 * 9/2003 Hagiwara .................... 370/251
6,643,342 B1 * 11/2003 Wakabayashi ............... 375/364

FOREIGN PATENT DOCUMENTS

JP 06-315025 11/1994
JP 08186473 7/1996

* cited by examiner

*Primary Examiner*—Jacques Louis-Jacques
*Assistant Examiner*—Sam Rizk
(74) *Attorney, Agent, or Firm*—Volentine & Whitt, P.L.L.C.

(57) ABSTRACT

A PHS terminal device has first and second checking mechanisms, first and second starting mechanisms, a first storing mechanism, first confirming mechanism, and processing mechanism. The first checking mechanism executes a first check to determine detection of a Unique Word when receiving a time slot and outputs a first interrupting signal upon detection. The first starting mechanism starts a first interrupting routine in response to the first interrupting signal. The first storing mechanism stores the first check result. The second checking mechanism executes a second check determining whether reception of the time slot is completed and outputs a second interrupting signal when reception of the time slot is completed, and the second starting mechanism starts a second interrupting routine in response. The first confirming mechanism confirms the first check result. The processing mechanism executes data processing of the time slot according to the confirmation result of the second interrupting routine.

12 Claims, 8 Drawing Sheets

PHS TERMINAL DEVICE AND METHOD OF RECEIVING PHS DATA

BACKGROUND OF THE INVENTION

1. Field of the Invention

The present invention generally relates to a PHS terminal device and a method of receiving PHS data. More specifically, the present invention relates to a PHS terminal device and a method of receiving PHS data, especially, a PHS terminal device, which receives PHS data that are made having a time slot including a Unique Word, and a method of receiving the PHS data.

2. Background Information

PHS (Personal Handyphone System) is called a second generation cordless telecommunication system. The Association of Radio Industries and Businesses (ARIB) defines the standard of the communication method of PHS. The standard is called the ARIB STANDARD and an example of the standard is RCR STD-28 V4.0. According to the standard, a PHS terminal device searches for a base station right after the PHS terminal device is activated. At that time, the PHS terminal device detects a control signal that a base station periodically emits. The control signal that the base station periodically emits contains data called a Unique Word (UW), and the PHS terminal device recognizes that it could find a base station if it detects a Unique Word in a control signal. To the contrary, if the PHS terminal device cannot detect a Unique Word, it recognizes that base stations are outside the communication range and periodically repeats a search for a base station. Related Examples of a conventional PHS terminal device are described in Japanese Patent Publications JP-A-6-315025 and JP-A-8-186473, which are hereby incorporated by reference.

Japanese Patent Publication JP-A-315025 (especially, page 4 and FIG. 1) discloses a PHS terminal device that is made of a reception data shift resister, a Unique Word detecting circuit, a slot counter circuit, and a timing control circuit. The reception data shift register outputs data of a bit position corresponding to the Unique Word to the Unique Word detecting circuit. The Unique Word detecting circuit receives data output from the reception data shift resister in real time, and outputs a corresponding signal if the received data correspond to a pattern of a Unique Word. The slot counter circuit establishes a slot synchronization by setting the initial value according to the corresponding signal, and reports establishment of the slot synchronization to the timing control circuit. The timing control circuit controls a timing of the whole receiving process in response to the report of the establishment of the slot synchronization. In addition, the Unique Word detecting circuit outputs the corresponding signal as a reception completed signal to a CPU.

Japanese Patent Publication JP-A-8-186473 (especially, page 3-4, FIGS. 1 and 5) discloses a PHS terminal device that is made of a local oscillator, a mixer, a demodulator, an error correction demodulator, a demodulator synchronization detecting circuit, a Unique Word detecting circuit, a carrier wave ID detecting comparator, and a local oscillator sweeping control circuit. The local oscillator sweeping control circuit sweeps frequencies of the local oscillator from an initial value. The mixer converts the reception data to an intermediate frequency signal. The demodulator demodulates the intermediate frequency signal. The error correction demodulator executes an error correction demodulation for the signal from the demodulator. The demodulator synchronization detecting circuit receives the signal from the modulator, and detects whether synchronization between a carrier wave and bit timing is established. The Unique Word detecting circuit receives the signal from the demodulator, and detects whether a Unique Word is detected. The carrier wave ID detecting comparator detects whether a carrier wave ID corresponds to a predefined carrier wave ID. The PHS terminal device executes a frame synchronization process only when a Unique Word is detected and a carrier wave ID corresponds to a predefined carrier wave ID after the synchronization between a carrier wave and a bit timing is established.

Downsizing and low-consumption technologies of a PHS terminal device have been developed recently. These types of technologies have also been developed for a baseband LSI for PHS terminal device functions in a battery saving mode. In the battery saving mode, for example, a PHS terminal device executes intermittent reception that stops the clock of a CPU while it does not receive data and lowers power consumption. However, it is difficult to output a reception reference signal correctly in the battery saving mode because the clock of the CPU is stopped between outputs of reception reference signals. Therefore, a Unique Word (UW) detecting signal is used as a synchronization signal in the battery saving mode. In a case that a UW detecting signal is used as a synchronization signal, a UW detecting indication bit is activated in synchronization with a UW detecting signal when a UW detecting signal is output in receiving reception data. Further, a UW detecting indication bit is reset in synchronization with a rising edge of a reception completion detection indication bit, and then a reception completion interrupting signal is output. In this case, there is a problem in that the check result of whether a UW detecting signal is detected cannot be confirmed because a UW detecting indication bit has already been reset in a reception completion interrupting routine started in response to a reception interrupting signal. However, in the patent publications described above, there is no description of the problem of a Unique Word being undetectable in the battery saving mode.

In view of the above, it will be apparent to those skilled in the art from this disclosure that there exists a need for an improved PHS terminal device and a method of receiving PHS data. This invention addresses this need in the art as well as other needs, which will become apparent to those skilled in the art from this disclosure.

SUMMARY OF THE INVENTION

It is an object of the present invention to provide a PHS terminal device and method of receiving PHS data that detects a Unique Word in the battery saving mode.

In order to solve the aforementioned problems, a PHS terminal device according to the present invention receives a time slot that contains PHS data including a Unique Word. The PHS terminal device includes a first checking mechanism, a first starting mechanism, a first storing mechanism, a second checking mechanism, a second starting mechanism, a first confirming mechanism, and a processing mechanism. The first checking mechanism executes a first check to check whether a Unique Word is detected when receiving the time slot and outputs a first interrupting signal if the Unique Word is shown to have been detected as a result of the first check. The first starting mechanism starts a first interrupting routine in response to the first interrupting signal. In the first interrupting routine, the first storing mechanism stores a result of the first check in a first software flag. The second checking mechanism executes a second check to check if reception of the time slot is completed, and outputs a second interrupting signal if the reception of the time slot is completed as a result of the second check. The second starting mechanism starts a second interrupting routine in response to the second interrupting signal. The first confirming mechanism confirms the result of the first check by confirming the first software flag in the second interrupting routine. In the second interrupting routine, the processing mechanism executes data processing of the time slot according to the confirmation result of the first confirming mechanism.

The PHS terminal device makes it possible to confirm a check result regarding whether a Unique Word can be detected. This is possible even after the completion of receiving the time slot. This is because in the first interrupting routine the PHS terminal device can store the check result of whether a Unique Word can be detected in the first software flag, and can confirm the first software flag in the second interrupting routine that is started after completion of receiving the time slot. Thus, the PHS terminal device can definitely confirm a check result as to whether a Unique Word can be detected and be reset on completion of receiving the time slot.

These and other objects, features, aspects, and advantages of the present invention will become apparent to those skilled in the art from the following detailed description, which, taken in conjunction with annexed drawings, discloses embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
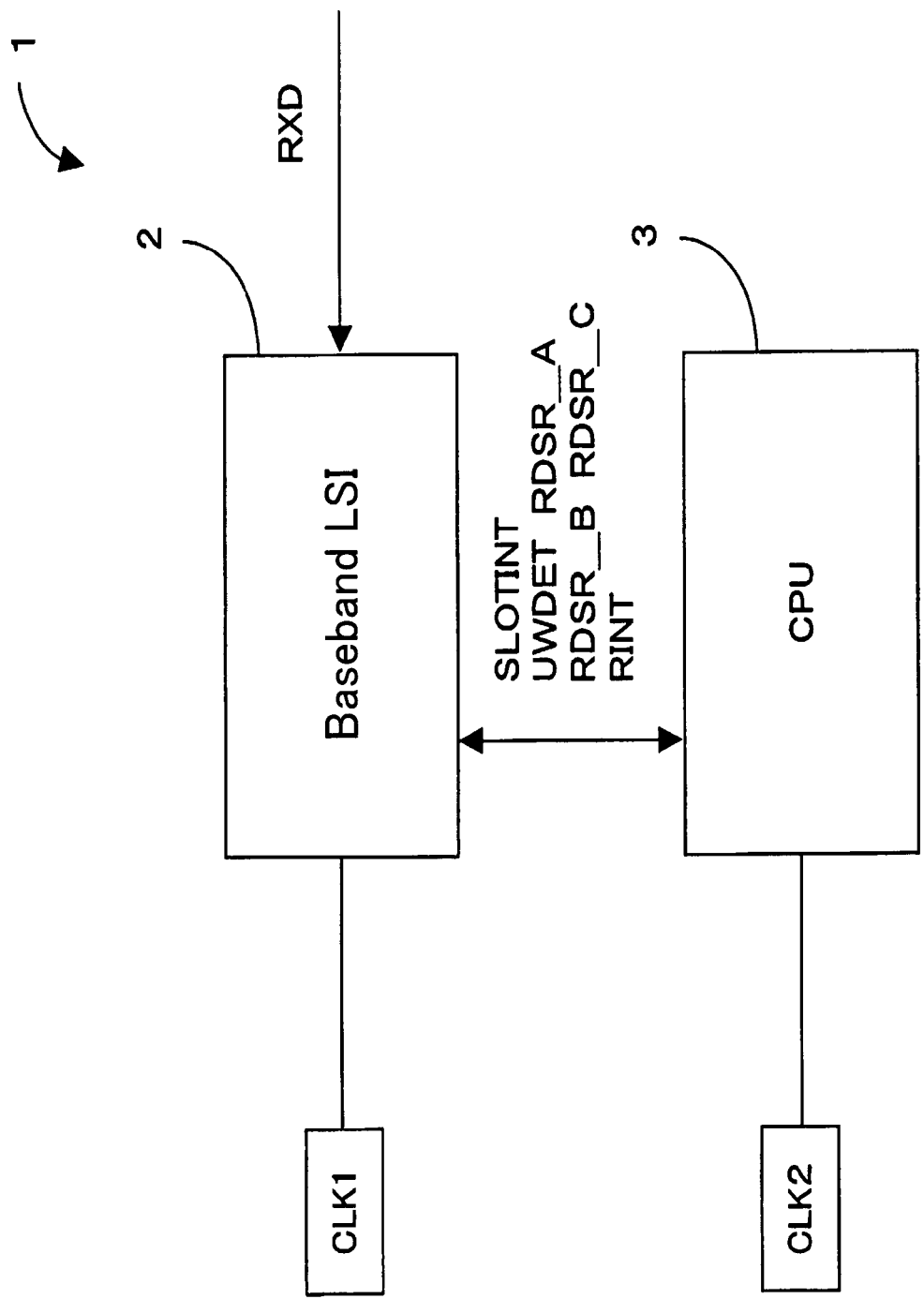
FIG. 1 is a view of a block diagram showing a configuration of a PHS terminal device in accordance with a first preferred embodiment of the present invention.

FIG. 1 is a view of a block diagram showing a configuration of a PHS terminal device in accordance with a first preferred embodiment of the present invention. As shown in FIG. 1, a PHS terminal device 1 has a baseband LSI 2, a CPU 3, a clock CLK1, and a clock CLK2. The baseband LSI 2 operates based on a clock signal of the clock CLK1, and receives PHS data (receive data RXD) through an antenna and a RF portion that are not shown in the diagram. The baseband LSI 2 (receiver) has a reception data register, a control data register, a reception reference signal generation circuit, and a timer. The reception data register temporarily stores the receive data RXD. The control data register stores control data that are included in the receive data RXD. The reception reference signal generation circuit generates a reception reference signal RX. The timer controls the generation of the reception reference signal RX in a continuous receiving mode and a battery saving mode to be hereinafter described. The control data register has a UW detecting indication bit RDSR_A that retains the check result when a Unique Word (hereinafter referred to as UW) is detected, a reception completion indication bit RDSR_B that retains the check result if the reception of a time slot is completed, and a CRC error non-detecting indication bit RDSR_C that retains the check result if a CRC error exists. The CPU 3 operates based on a clock signal of the clock CLK2 and controls the baseband LSI 2. The CPU 3 controls the reception reference signal generation circuit of the baseband LSI 2 in a burst receiving mode to be hereinafter described so that the base band LSI 2 generates the reception reference signal RX that synchronizes with the reception of a time slot. The operations of the baseband LSI 2 and the CPU 3 are described in detail with reference to a time chart and a flow chart to be hereinafter described.

The Receiving Mode

The PHS terminal device 1 receives the receive data RXD in a burst receiving mode, a continuous receiving mode, and a battery saving mode. The burst receiving mode is the mode in which the receive data RXD are received using the reception reference signal RX that synchronizes with the timing of the time slot of the receive data RXD.

The continuous receiving mode is the mode in which the receive data RXD are received while the reception reference signal RX is being output on a steady basis in a search for a base station right after the PHS terminal device 1 is activated. The reception reference signal RX does not synchronize with a timing of receiving the time slot of the receive data RXD.

The battery saving mode is the mode in which the receive data RXD are received while the clock CLK2 of the CPU 3 is suspended to a lower power consumption for the PHS terminal device 1 and the receive data RXD are received intermittently. In short, the clock CLK2 of the CPU 3 is suspended in the battery saving mode. The reception reference signal RX does not synchronize with a timing of receiving the time slot of the receive data RXD in the battery saving mode.

Burst Receiving Mode

Figure 2:
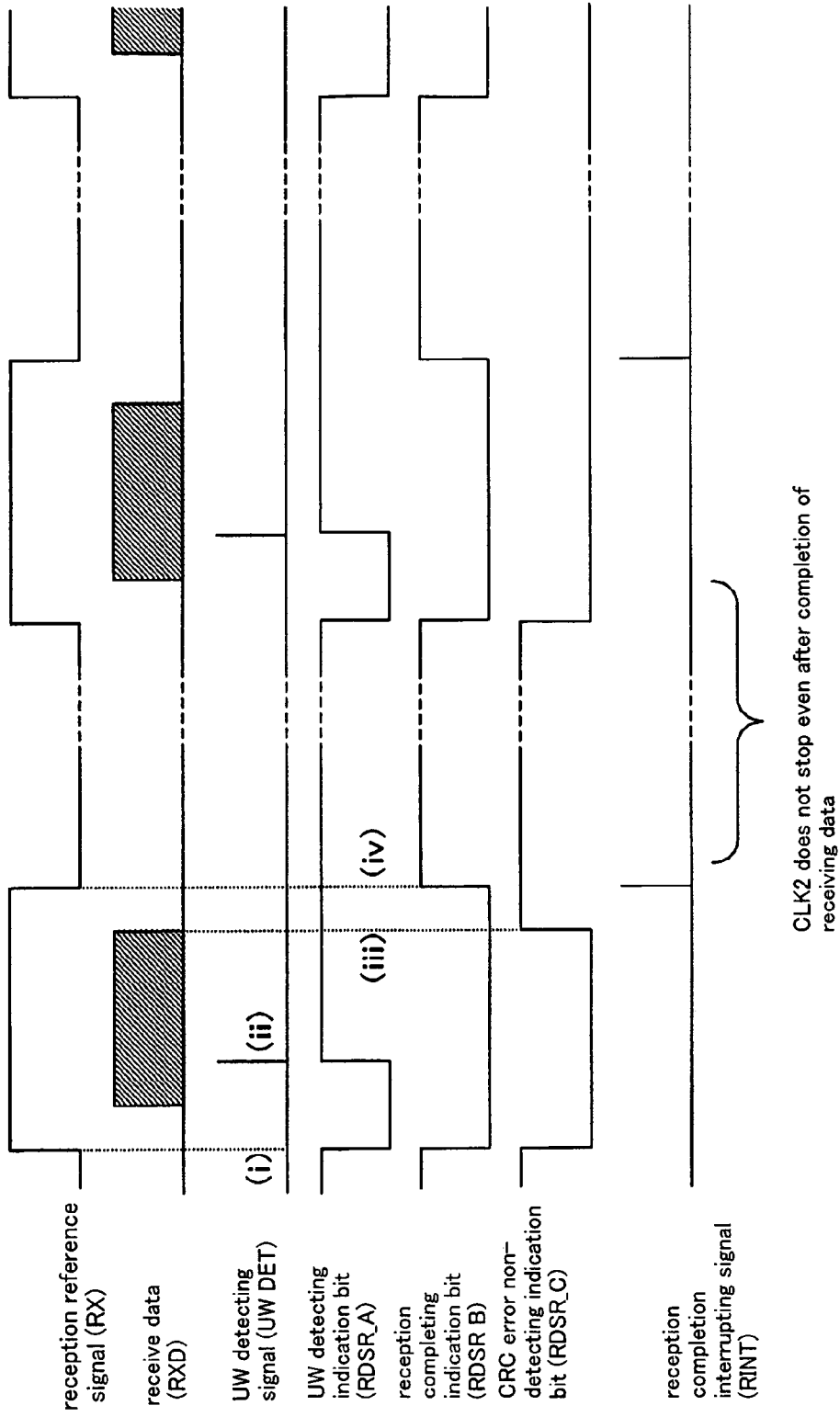
FIG. 2 is a view of a timing chart of a receiving process executed by a baseband LSI of the PHS terminal device in a burst receiving mode.
Figure 3:
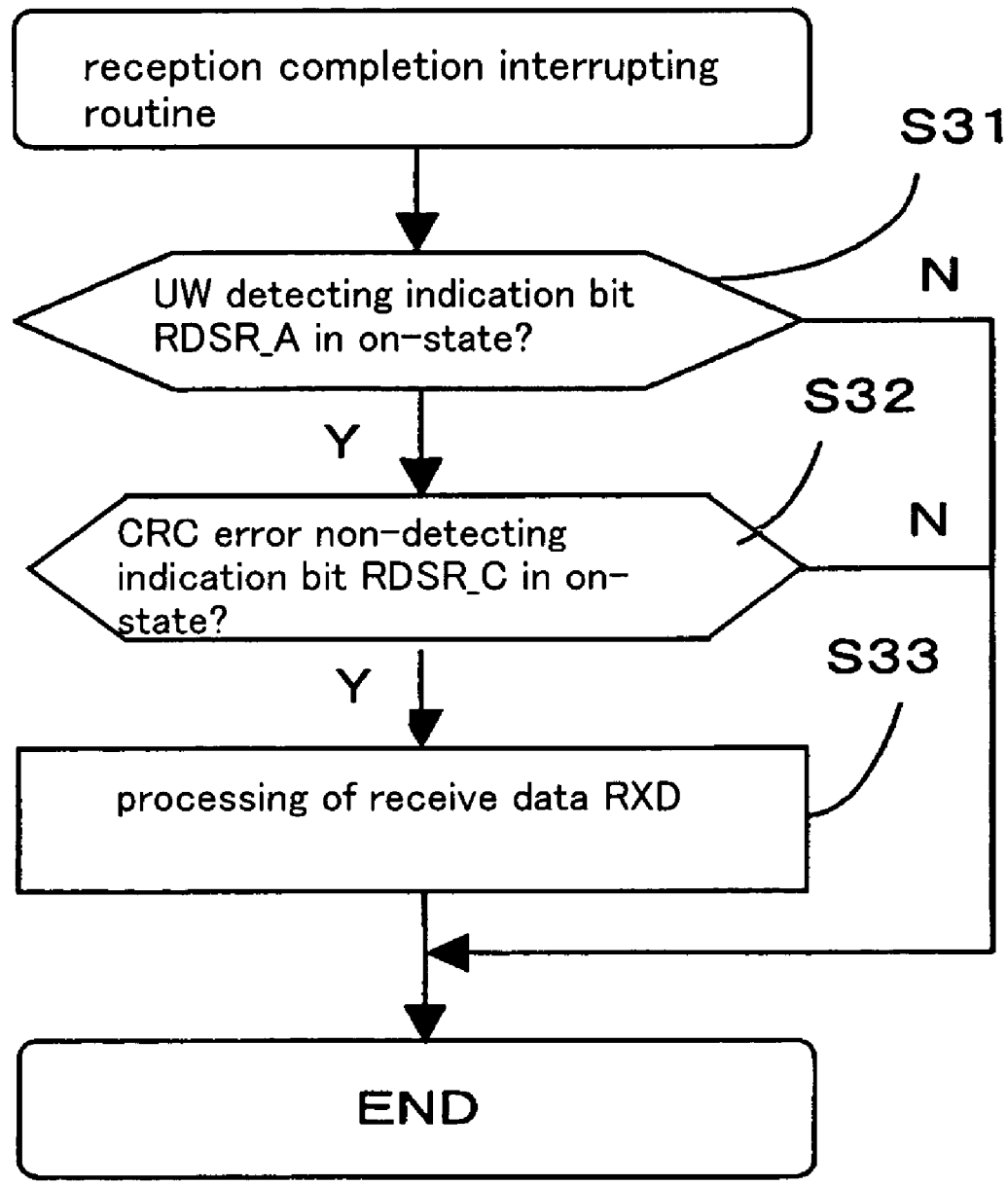
FIG. 3 is a view of a flow chart of a reception completion interrupting routine executed by a CPU of the PHS terminal device in the burst receiving mode.

FIG. 2 is a timing chart of a receiving process by the baseband LSI 2 in the burst receiving mode. FIG. 3 is a flow chart of a reception completion interrupting routine that is executed by the CPU 3.

As shown by (i) in FIG. 2, the baseband LSI 2 resets the UW detecting indication bit RDSR_A, the reception completion indication bit RDSR_B, and the CRC error non-detecting indication bit RDSR_C, when the reception reference signal RX is output.

When the reception of the receive data RXD is started and a UW is detected, the baseband LSI 2 outputs a UW detecting signal (UW DET) and activates the UW detecting indication bit RDSR_A of the control data register in synchronization with output of the UW detecting signal UW DET. These steps are referred to as "UW check" with reference to (ii) of FIG. 2.

In addition, the baseband LSI 2 checks if a CRC error exists in the received time slot, using the CRC data in the time slot. If a CRC error does not exist in the received time slot, the baseband LSI 2 activates the CRC error non-detecting indication bit RDSR_C of the control data resister. Referring now to (iii) of FIG. 2, these steps are referred to as "CRC error check."

Then, when the reception reference signal RX is suspended, the baseband LSI 2 activates the reception completion indication bit RDSR_B in synchronization with the suspension of the reception reference signal RX. Further, the baseband LSI 2 outputs a reception completion interrupting signal RINT in synchronization with the on-state of the reception completion indication bit RDSR_B.

As shown in FIG. 3, if the CPU 3 starts the reception completion interrupting routine when the CPU 3 receives the reception completion interrupting signal RINT, and checks whether the UW detecting indication bit RDSR_A is in the on-state (i.e., confirmation of the result of UW check (Step S31)). If it is in the on-state, the CPU 3 checks whether the CRC error non-detecting indication bit RDSR_C is in the on-state (i.e., confirmation of the result of CRC error check (Step S32)). If both the RDSR_A and the RDSR_B are in the on-state, that is, if the UW is detected and at the same time the CRC error does not exist, or if both of the results of the UW check and the CRC error check indicate passing, the CPU 3 executes processing of the receive data RXD (Step S33). In other cases, that is, if at least either of the results of the UW check and the CRC error check indicates failure, the CPU 3 does not execute the processing of the receive data RXD and exits the reception completion interrupting routine.

The Continuous Receiving Mode and the Battery Saving Mode

Figure 4:
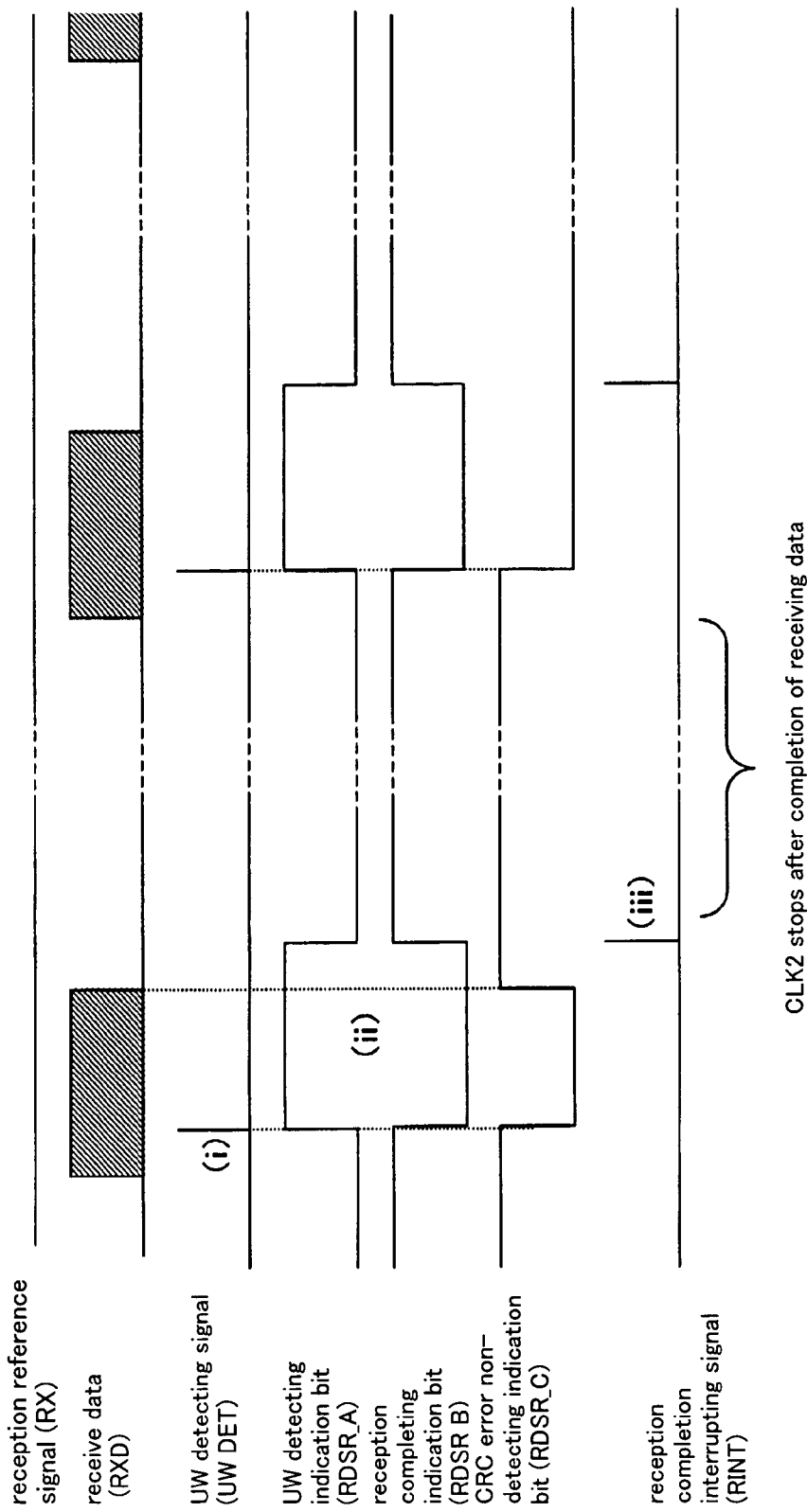
FIG. 4 is a view of a timing chart of receiving process executed by the baseband LSI in a continuous receiving mode and a battery saving mode.

FIG. 4 is a view of a timing chart illustrating a receiving process by the baseband LSI 2 in the continuous receiving mode and the battery saving mode. As described above, the reception reference signal RX does not synchronize with the timing of receiving the time slot of the receive data RXD in the continuous receiving mode and the battery saving mode. The UW detecting signal (UW DET) is used as a synchronization signal in these modes.

As shown in FIG. 4, the baseband LSI 2 (first checking mechanism) outputs the UW DET when a UW is detected. Further, the baseband LSI 2 activates the UW detecting indication bit RDSR_A of the control data register in synchronization with the UW DET and resets the reception completion indication bit RDSR_B and the CRC error non-detecting indication bit RDSR_C (see (i) of FIG. 4). The baseband LSI 2 checks whether a CRC error exists in the time slot of the receive data RXD using the CRC data that are included in the time slot. If the CRC error does not exist in the time slot, the baseband LSI 2 activates the CRC error non-detecting indication bit RDSR_C of the control data register (see (ii) of FIG. 4).

In addition, the baseband LSI 2 activates the reception completion indication bit RDSR_B when the reception of the time slot is completed, and resets the UW detecting indication bit RDSR_A, and outputs the reception completion interrupting signal RINT (see (iii) of FIG. 4).

Figure 5:
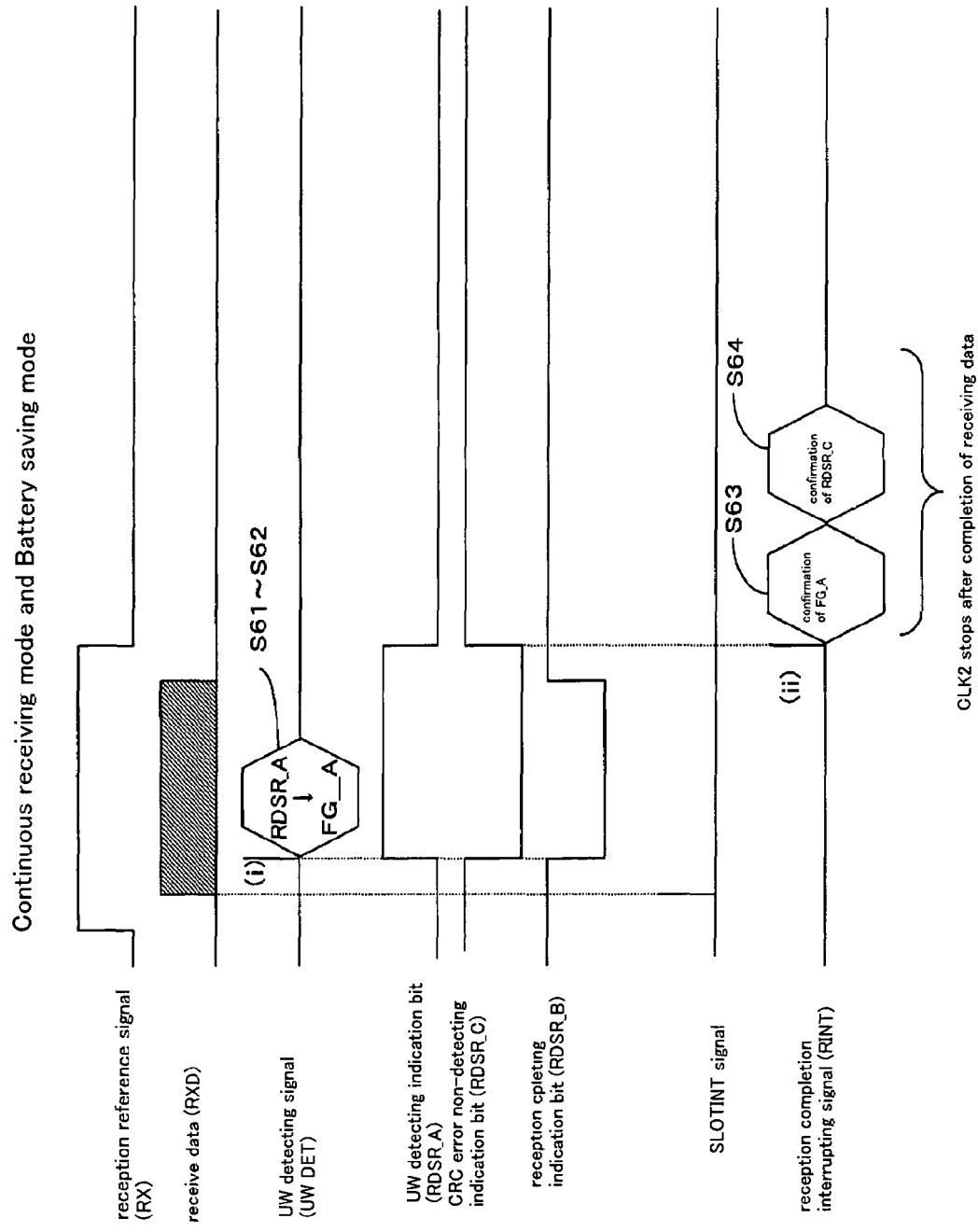
FIG. 5 is a view of a timing chart illustrating a timing of a process executed in an interrupting routine added to a timing chart of the receiving process executed by the baseband LSI of the first embodiment in the continuous receiving mode and the battery saving mode.
Figure 6:
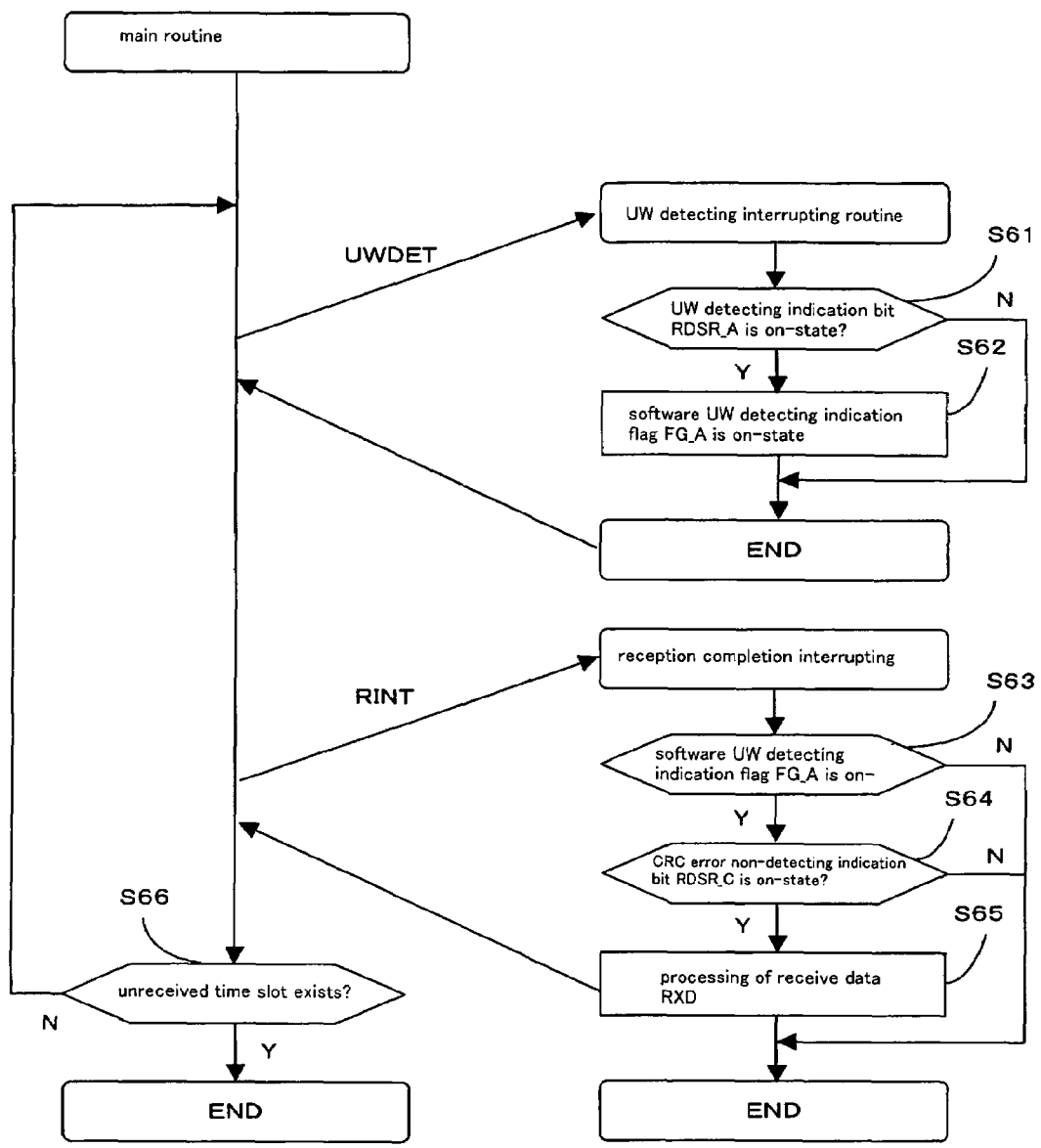
FIG. 6 is a view of a flow chart illustrating a process executed by the CPU in the continuous receiving mode and the battery saving mode of the first embodiment.

As shown in FIG. 4, in the continuous receiving mode and the battery saving mode, only the UW DET can be used as the synchronization signal because the reception reference signal RX cannot be used as the synchronization signal. Thus the UW detecting indication bit RDSR_A has to be activated in synchronization with the UW DET and be reset in synchronization with the reception completion interrupting signal RINT. Therefore, when confirmation of the UW detecting indication bit RDSR_A is executed by the same processing shown in FIG. 4 in the reception completion interrupting routine started by the reception completion interrupting signal RINT, the result of the UW check cannot be confirmed. This is because the UW detecting indication bit RDSR_A has already been reset at the time when the reception completion interrupting signal RINT was output. In the first embodiment of the present invention, the processing operations that are shown in FIGS. 5 and 6 are employed to solve this problem. These processing operations make it possible to confirm the check results as to whether a UW is detected with certainty even in the continuous receiving mode and the battery saving mode.

FIG. 5 is a timing chart illustrating the timing of a process executed in a UW detecting interrupting routine being added to a timing chart of the receiving process executed by the baseband LSI 2 in the continuous receiving mode and the battery saving mode. Further, a SLOTINT signal, which is not illustrated in FIGS. 2 and 4, is shown in FIG. 5. The SLOTINT signal is output to inform the CPU 3 of the onset of data, such as a time slot, when the baseband LSI 2 detects the data head of the receive data RXD.

FIG. 6 is a flow chart of a process executed by the CPU 3 in the continuous receiving mode and the battery saving mode.

The CPU 3 (first starting mechanism) starts the UW detecting interrupting routine, when the CPU 3 receives the UW DET from the baseband LSI 2. The CPU 3 checks whether the UW detecting indication bit RDSR_A is in the on-state in the UW detecting interrupting routine (Step S61). The CPU 3 (first storing device) activates the software UW detecting indication flag FG_A if the RDSR_A is in the on-state (Step S62) and stores the result. On the other hand, if the RDSR_A is in the off-state, the CPU 3 exits the routine without activating the software UW detecting indication flag FG_A. In this case, the software UW detecting indication flag FG_A remains in the off-state.

The CPU 3 (second starting mechanism) executes the reception completion interrupting routine, when the CPU 3 receives the reception completion interrupting signal RINT from the LSI 2 (second checking mechanism). The CPU 3 (first confirming mechanism) checks whether the software UW detecting indication flag FG_A is in the on-state (i.e., confirmation of the result of the UW check (Step S63)), and checks whether the CRC error non-detecting indication bit RDSR_C is in the on-state (i.e., confirmation of the result of the CRC error check (Step S64)). The CPU 3 (processing mechanism) confirms the CRC error non-detecting indication bit RDSR_C if the software UW detecting indication flag FG_A is in the on-state, and executes the processing of the receive data RXD if the CRC error non-detecting indication bit RDSR_C is in the on-state, and then exits the routine (S65). On the other hand, the CPU 3 exits the routine without executing the processing of the receive data RXD if at least either of the software UW detecting indication flag FG_A and the CRC error non-detecting indication bit RDSR_C is in the off-state (i.e., if at least either of the results of the UW check and the CRC error check is not passed).

Then, the CPU 3 returns to the main routine and checks whether an unreceived time slot exists (S66). If the unreceived time slot exists, the CPU 3 waits for the processing of the next time slot. On the other hand, if the unreceived time slot does not exist, the CPU 3 exits the main routine and makes the PHS terminal device 1 operate in an idle state.

Operation/Working-Effect

As shown in FIGS. 5 and 6, before the execution of outputting the reception completion interrupting signal RINT, in the UW detecting interrupting routine, the CPU 3 stores the state of the UW detecting indication bit RDSR_A retaining the result of the UW check in the software UW detecting indication flag FG_A. Further, the CPU 3 confirms the result of the UW check by confirming the state of the software UW detecting indication flag FG_A in the reception interrupting routine that is started by the reception completion interrupting signal RINT. In other words, the result of the UW check can be confirmed by confirming the software UW detecting indication flag FG_A in the reception completion interrupting routine, after the UW detecting indication bit RDSR_A is reset at the timing that the reception completion indication bit RDSR_B is in the on-state. Therefore, the result of the UW check can be confirmed in the reception completion interrupting routine, even if the result of the UW check shows rest at the completion of receiving the time slot in the continuous receiving mode and the battery saving mode.

In the first embodiment of the present invention, the processing described in FIG. 6 is applied to the continuous receiving mode and the battery saving mode. If the processing described in FIG. 6 is applied to other receiving modes (e.g., the burst receiving mode), confirmation of the result of the UW check in the reception completion interrupting routine can be executed more accurately in other receiving modes than in other receiving modes that the processing described in FIG. 6 is not applied. For example, if the processing described in FIG. 6 is executed in the burst receiving mode instead of executing the processing described in FIG. 2, confirmation of the result of the UW check can be executed more accurately in the burst receiving mode than in the burst receiving mode in which the processing described in FIG. 2 is executed.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the result of the CRC error check is confirmed after confirmation of the UW check is executed in the reception completion interrupting routine as shown in FIG. 6. In contrast to the first embodiment, in the second embodiment, confirmation of the result of the CRC error check is executed prior to the starting of the reception completion interrupting routine, and confirmation of the result of the CRC error check to be executed after the completion of receiving the time slot is omitted. Due to this, the processing time of the PHS communication protocol software is shortened and the processing speed of the PHS communication protocol software is increased. In addition, confirmation of the result of the CRC error check is executed prior to the starting of the reception completion interrupting routine. If the CRC error exists in the CRC error check, the CPU 3 omits the reception completion interrupting routine. This reduces the burden of the processing on the PHS communication protocol software.

Figure 7:
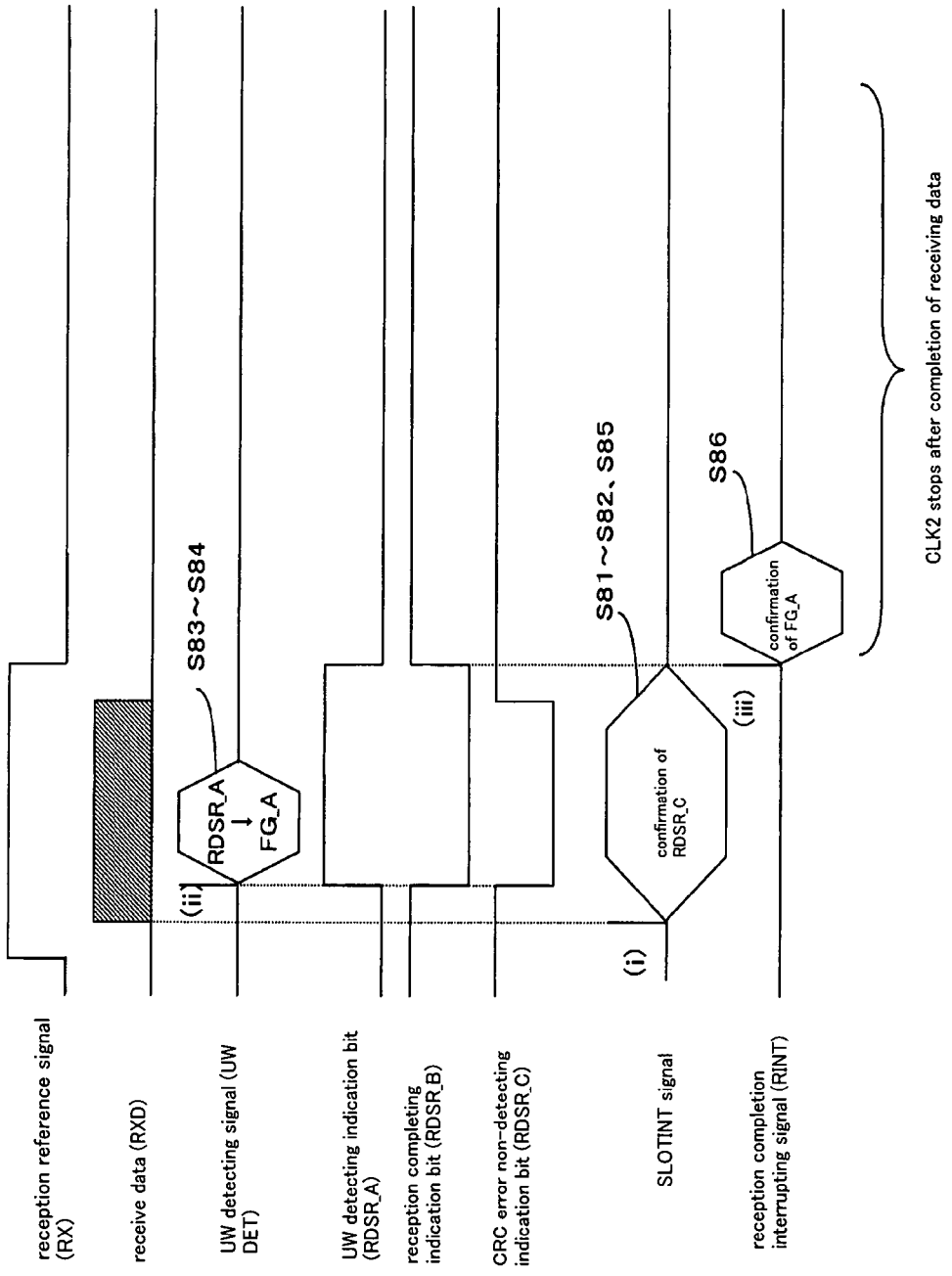
FIG. 7 is a view of a timing chart illustrating the timing of a process executed in an interrupting routine added to a timing chart of a receiving process executed by the baseband LSI in the continuous receiving mode and the battery saving mode in accordance with a second preferred embodiment of the present invention.

FIG. 7 is a view of a timing chart that illustrates the timing of a process executed in the interrupting routine added to a timing chart of the receiving process executed by the baseband LSI 2 in the continuous receiving mode and the battery saving mode. The SLOTINT signal is output to inform the CPU 3 of the onset of data, such as the time slot, when the baseband LSI 2 (third checking mechanism) detects a data head of the receive data RXD.

Figure 8:
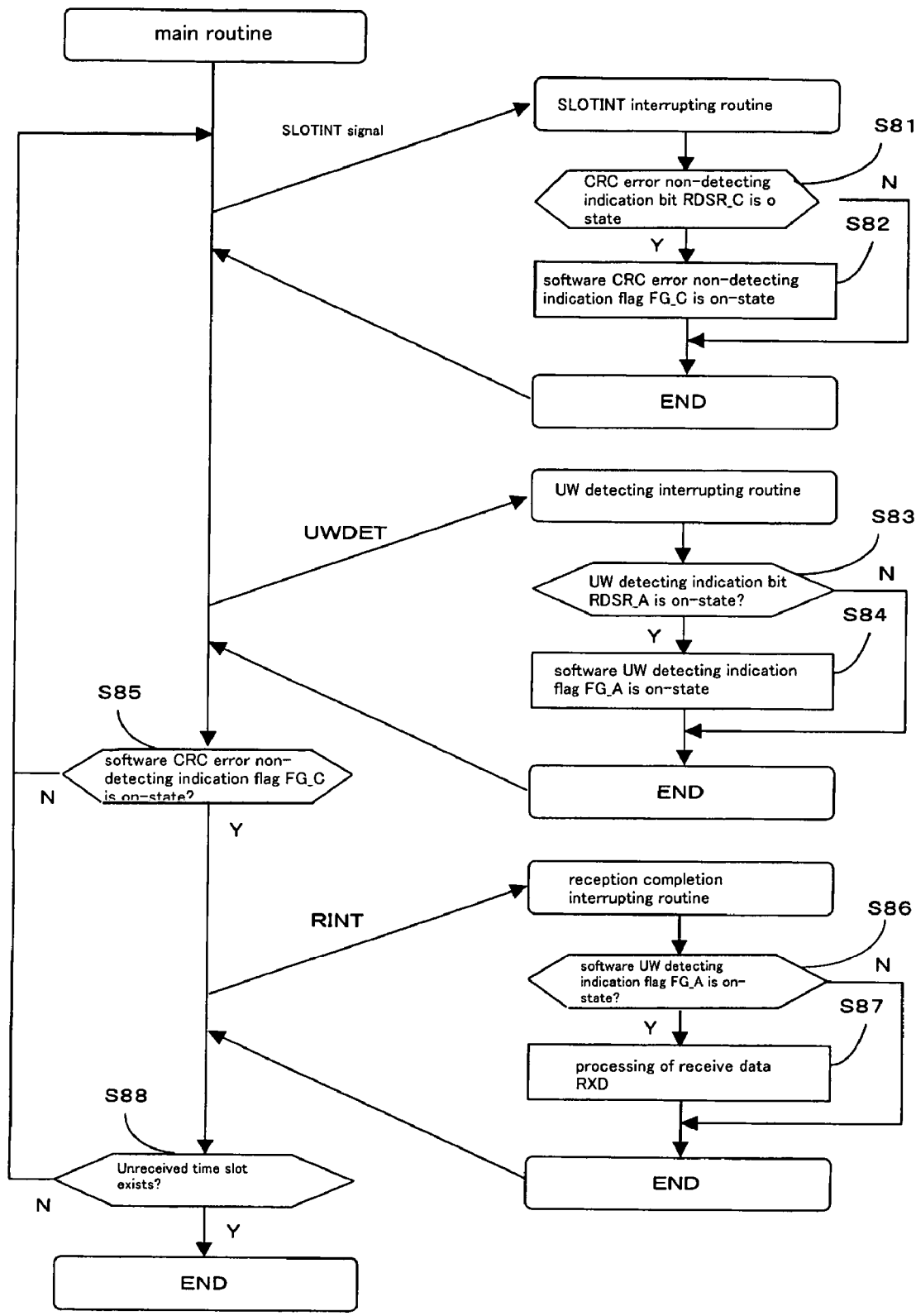
FIG. 8 is a view of a flow chart showing the execution by the CPU in the continuous receiving mode and the battery saving mode of the second embodiment.

FIG. 8 is a view of a flow chart illustrating the execution by the CPU 3 in the continuous receiving mode and the battery saving mode of the second embodiment.

The CPU 3 starts the SLOTINT interrupting routine when the CPU 3 receives the SLOTINT signal from the baseband LSI 2. The CPU 3 checks whether the CRC error non-detecting indication bit RDSR_C is in the on-state in the SLOTINT interrupting routine (Step S81). The CPU 3 activates the software CRC error non-detecting indication flag FG_C if the CRC error non-detecting indication bit RDSR_C is in the on-state (Step S82). On the other hand, if the CRC error non-detecting indication bit RDSR_C is in the off-state, the CPU 3 exits the routine without activating the software CRC error non-detecting indication flag FG_C. In this case, the software CRC error non-detecting indication flag FG_C remains in the off-state.

The CPU 3 executes the UW detecting interruption routine, when the CPU 3 receives the UW DET from the baseband LSI 2. The CPU 3 checks whether the UW detecting indication bit RDSR_A is in the on-state in the UW detecting interruption routine (Step S83). The CPU 3 activates the software UW detecting indication flag FG_A if the UW detecting indication bit RDSR_A is in the on-state (Step S84). On the other hand, if the UW detecting indication bit RDSR_A is in the off-state, the CPU 3 exits the routine without activating the software UW detecting indication flag FG_A. In this case, the software detecting indication flag FG_A remains in the off-state.

In Step S85, the CPU 3 (second confirming mechanism) checks whether the software CRC error non-detecting indication flag FG_C, which is processed in the SLOTINT interrupting routine, is in the on-state. In other words, confirmation of the result of the CRC error check is executed. If the software CRC error non-detecting indication flag FG_C is in the on-state, that is, if the result of the CRC error check indicates passing, the CPU 3 resets the software CRC error non-detecting indication flag FG_C, and executes the reception completion interrupting routine after receiving the reception completion interrupting signal RINT. On the other hand, if the software CRC error non-detecting indication flag FG_C is in the off-state (i.e., if the result of the CRC error check is not passed), the CPU 3 (admitting mechanism) resets the software CRC error non-detecting indication flag FG_C, and executes the processing of the next time slot before receiving the reception completion interrupting signal RINT.

The CPU 3 executes the reception completion interrupting routine when the CPU 3 receives the reception completion interrupting signal RINT. In the reception completion interrupting routine, the CPU 3 executes the checks to determine whether the software UW detecting indication flag FG_A is in the on-state (i.e., confirmation of the result of the UW detecting check (Step S86)). If the software UW detecting indication flag FG_A is in the on-state (i.e., if the result of the UW check indicates passing), the CPU 3 resets the software UW detecting indication flag FG_A and executes the processing of the receive data RXD (Step S87) and exits the routine. On the other hand, if the software UW detecting indication flag FGA is in the off-state (i.e., if the result of the UW check does not indicate passing), the CPU 3 resets the software UW detecting indication flag FG_A and exits the routine without executing the processing of the receive data RXD.

Then, in Step S88, the CPU 3 returns to the main routine and checks whether an unreceived time slot exists. If the unreceived time slot exists, the CPU 3 waits for the processing of the next time slot. On the other hand, if the unreceived time slot does not exist, the CPU 3 exits the routine and makes the PHS terminal device 1 operate in an idle state.

Operation/Working Effect

The PHS terminal device 1 of the second embodiment of the present invention has the same working effect as that of the first embodiment of the present invention as follows. The CPU 3 stores the state of the UW detecting indication bit RDSR_A, which retains the result of the UW check, in the software UW detecting indication flag FG_A before receiving the reception completion interrupting signal RINT. Due to this, the result of the UW check can be confirmed by confirming the software UW detecting indication flag FG_A after receiving the time slot. Therefore, the result of the UW check can be confirmed accurately in the reception interrupting routine, even if the result of the UW check indicates rest at the completion of receiving the time slot in the continuous receiving mode and the battery saving mode.

In addition, in the SLOTINT interrupting routine that is started by SLOTINT signal at the onset of receiving the time slot, the PHS terminal device 1 of the second embodiment stores the state of the CRC error non-detecting indication bit RDSR_C in the software CRC error non-detecting indication flag FG_C, and confirms the state of the software CRC error non-detecting indication flag FG_C before the output of the reception completion interrupting signal RINT. Therefore, confirmation of the result of the CRC error check is not necessary after receiving the time slot, and thus the processing time of the PHS communication protocol software can be reduced. Furthermore, if the CRC error exists by confirming the software CRC error non-detecting indication flag FG_C before output of the reception completion interrupting signal RINT, the reception completion interrupting routine (i.e., confirmation of the result of the UW check and data processing) can be omitted, and thus the burden of the processing of the PHS communication protocol software can be reduced and the processing speed of the PHS communication protocol software can be speeded up.

In the second embodiment of the present invention, the processing described in FIG. 8 is applied to the continuous receiving mode and the battery saving mode. If the processing described in FIG. 8 is applied to other receiving modes (e.g., the burst receiving mode), confirmation of the result of the UW check in the reception completion interrupting routine can be executed more accurately in other receiving modes than in receiving modes for which the processing described in FIG. 8 is not applied. For example, if the processing described in FIG. 8 is executed in the burst receiving mode instead of executing the processing in FIG. 2, confirmation of the result of the UW check can be executed more accurately in the burst receiving modes than in the burst receiving modes for which the processing in FIG. 2 is executed.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-056775. The entire disclosure of Japanese Patent Application No. 2004-056775 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A PHS terminal device comprising:
   a receiver that receives a time slot containing PHS data including a unique word;
   a first checking mechanism that executes a first check to determine detection of said unique word upon receipt of said time slot by said receiver and that outputs a first interrupting signal upon said first check indicating detection of said unique word;
   a first starting mechanism that starts a first interrupting routine in response to said first interrupting signal;
   a first storing mechanism that stores a result of said first check in a first software flag during said first interrupting routine;
   a second checking mechanism that executes a second check to determine completion of reception of said time slot and that outputs a second interrupting signal upon indication of completion of reception of said time slot responsive to said second check; a second starting mechanism that starts a second interrupting routine in response to said second interrupting signal;
   a first confirming mechanism that confirms said result of said first check by confirming said first software flag during said second interrupting routine;
   a processing mechanism that executes data processing of said time slot according to a confirmation result of said first confirming mechanism during said second interrupting routine,
   said time slot further includes CRC data;
   a third checking mechanism that executes a third check to check if a CRC error exists based on said CRC data;
   a second confirming mechanism that confirms a result of said third check; and an admitting mechanism that admits data processing by said processing mechanism based on a confirmation result by said second confirming mechanism, wherein said second confirming mechanism confirms a result of said third check before said second interrupting signal is output, and said admitting mechanism omits starting of said second interrupting routine when said CRC error is shown to exist as said confirmation result by said second confirming mechanism.

2. The PHS terminal device according to claim 1, further comprising:

a second storing mechanism that stores said result of said third check in a second software flag, wherein said second confirming mechanism confirms said result of the third check by confirming said second software flag.

3. The PHS terminal device according to claim 1, wherein said second confirming mechanism confirms a result of said third check during said second interrupting routine.

4. The PHS terminal device according to claim 1, wherein said first checking mechanism stores said result of said first check in a first memory, and said first storing mechanism stores the state of said first memory in said first software flag before said state of said first memory is reset by a reselling mechanism that resets said state of said first memory by synchronization with said second interrupting signal.

5. A PHS terminal device comprising:

a receiver that receives a time slot containing PHS data including a unique word;

a baseband LSI that executes a first check to determine detection of said unique word when receiving said time slot, outputs a first interrupting signal upon detection of said unique word responsive to a result of said first check, executes a second check to determine completion of reception of said time slot, and outputs a second interrupting signal upon completion of reception of said time slot responsive to a result of said second check; and a CPU that starts a first interrupting routine in response to said first interrupting signal, stores said result of said first check in a first software flag during said first interrupting routine, starts a second interrupting routine in response to said second interrupting signal, confirms said result of said first check by confirming said first software flag, and executes data processing of said time slot according to a confirmation result of said first check, wherein said time slot further includes CRC data, said baseband LSI further executes a third check to check whether a CRC error exists based on said CRC data, and said CPU confirms a result of said third check and admits said data processing according to a confirmation result thereof, and said CPU confirms said result of said third check before said second interrupting signal is output, and omits starting said second interrupting routine when said CRC error exists responsive to said confirmation of said result of said third check.

6. The PHS terminal device according to claim 5, wherein said CPU stores a result of said third check executed by said baseband LSI in a second software flag, and confirms a result of said third check by confirming said second software flag.

7. The PHS terminal device according to claim 5, wherein said CPU confirms a result of said third check during said second interrupting routine.

8. The PHS terminal device according to claim 5, wherein said baseband LSI stores said result of said first check in a first memory and resets a state of said first memory by synchronization with said second interrupting signal, and said CPU stores said state of said first memory in said first software flag before said state of said first memory is reset during said first interrupting routine.

9. A method of receiving PHS data comprising:

receiving a time slot containing PHS data including a unique word;

executing a first check to check detection of said unique word when receiving said time slot and outputting a first interrupting signal upon detection of said unique word as a result of said first check;

running a first interrupting routine in response to said first interrupting signal;

storing a result of said first check in a first software flag during said first interrupting routine;

executing a second check to check completion of reception of said time slot and outputting a second interrupting signal upon completion of said reception of said time slot as a result of said second check;

running a second interrupting routine in response to said second interrupting signal;

confirming said result of said first check by confirming said first software flag during said second interrupting routine;

executing data processing of said time slot according to a confirmation result by said first confirming mechanism during said second interrupting routine, wherein said time slot includes CRC data;

executing a third check to check whether a CRC error exists based on said CRC data;

confirming a result of said third check; and admitting execution of executing data processing based on a confirmation result of said third check;

wherein said confirming a result of said third check occurs before said second interrupting signal is output, and said admitting execution of executing data includes omitting starting said second interrupting routine when said CRC error exists as a result of said second confirming step.

10. The method of receiving PHS data according to claim 9, further comprising;

storing said result of said third check in a second software flag, said confirming a result of said third check includes confirming said result of said third check by confirming said second software flag.

11. The method of receiving PHS data according to claim 9, wherein said confirming a result of said third check is executed during said second interrupting routine.

12. The method of receiving PHS data according to claim 9, wherein said executing a first check includes said result of said first check stored in a first memory, and said storing a result of said first check includes a state of said first memory stored in said first software flag before said state of said first memory is reset by synchronization with said second interrupting signal.

* * * * *